(12) United States Patent
Hashimoto et al.

(10) Patent No.: US 11,868,734 B2
(45) Date of Patent: Jan. 9, 2024

(54) DIALOGUE SYSTEM

(71) Applicant: NTT DOCOMO, INC., Chiyoda-ku (JP)

(72) Inventors: Takanori Hashimoto, Chiyoda-ku (JP); Hiroshi Fujimoto, Chiyoda-ku (JP); Yuriko Ozaki, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 677 days.

(21) Appl. No.: 17/044,140

(22) PCT Filed: Jan. 11, 2019

(86) PCT No.: PCT/JP2019/000774
§ 371 (c)(1),
(2) Date: Sep. 30, 2020

(87) PCT Pub. No.: WO2019/202788
PCT Pub. Date: Oct. 24, 2019

(65) Prior Publication Data
US 2021/0157988 A1     May 27, 2021

(30) Foreign Application Priority Data
Apr. 16, 2018  (JP) ................. 2018-078381

(51) Int. Cl.
*G06F 40/35*  (2020.01)
*G06F 16/903* (2019.01)
*G06F 40/279* (2020.01)

(52) U.S. Cl.
CPC ........ *G06F 40/35* (2020.01); *G06F 16/90335* (2019.01); *G06F 40/279* (2020.01)

(58) Field of Classification Search
CPC .. G06F 40/35; G06F 16/90335; G06F 40/279; G06F 16/3329
See application file for complete search history.

(56) References Cited

U.S. PATENT DOCUMENTS

| 8,566,102 B1 * | 10/2013 | Bangalore | G10L 15/22 |
| | | | 704/270.1 |
| 2007/0196804 A1 * | 8/2007 | Yoshimura | G09B 7/02 |
| | | | 434/323 |

(Continued)

FOREIGN PATENT DOCUMENTS

JP  2015-36945 A  2/2015

OTHER PUBLICATIONS

International Preliminary Report on Patentability and Written Opinion dated Oct. 29, 2020 in PCT/JP2019/000774 (submitting English translation only), 8 pages.

(Continued)

*Primary Examiner* — Bhavesh M Mehta
*Assistant Examiner* — Philip H Lam
(74) *Attorney, Agent, or Firm* — Oblon, McClelland, Maier & Neustadt, L.L.P.

(57) ABSTRACT

The dialogue system includes a keyword acquisition unit configured to acquire an input key group containing one or a plurality of input keywords on the basis of an input of a character string, a category generation unit configured to classify the resulting sentence candidates into a plurality of categories on the basis of a comparison between the input key group acquired by the keyword acquisition unit and the storage key group contained in an FAQ database, an intra-category ranking determination unit configured to determine a priority ranking of the resulting sentence candidates within each of the categories, and a presentation unit configured to select a resulting sentence candidate of a highest priority ranking determined by the intra-category ranking determination unit from within a category of a highest priority ranking determined in advance, and present a response for prompting a user to make an additional input.

10 Claims, 7 Drawing Sheets

| QUESTION SENTENCE | STORAGE KEY GROUP | REPLY |
|---|---|---|
| I WANT TO SEND EMAIL | MAIL, SEND | ... |
| I WANT TO ATTACH URL TO EMAIL | URL, MAIL, ATTACH | ... |
| I WANT TO ATTACH A VIDEO TO MY EMAIL AND SEND IT | MAIL, SEND, ATTACH, VIDEO | ... |
| I WANT TO DELETE THE VIDEO ATTACHED TO THE EMAIL I'M SENDING | MAIL, SEND, ATTACH, VIDEO, DELETE | ... |

(56) References Cited

U.S. PATENT DOCUMENTS

| | | | | |
|---|---|---|---|---|
| 2008/0104065 | A1* | 5/2008 | Agarwal | G06Q 10/10 |
| 2009/0012926 | A1* | 1/2009 | Ishikawa | G06F 16/3325 |
| | | | | 706/47 |
| 2015/0142420 | A1* | 5/2015 | Sarikaya | G10L 15/1815 |
| | | | | 704/9 |
| 2015/0356089 | A1* | 12/2015 | Jamrog | G06F 16/24578 |
| | | | | 707/723 |
| 2018/0025075 | A1* | 1/2018 | Beller | G06F 16/3329 |
| | | | | 707/769 |
| 2019/0005138 | A1* | 1/2019 | Andreica | G06F 16/9535 |

OTHER PUBLICATIONS

Office Action dated Sep. 14, 2021 in corresponding Japanese Patent Application No. 2020-513968 (with English Translation), 6 pages.
International Search Report dated Mar. 26, 2019 in PCT/JP2019/000774 filed Jan. 11, 2019, 2 pages.

\* cited by examiner

Fig.2

| QUESTION SENTENCE | STORAGE KEY GROUP | REPLY |
|---|---|---|
| I WANT TO SEND EMAIL | MAIL, SEND | ... |
| I WANT TO ATTACH URL TO EMAIL | URL, MAIL, ATTACH | ... |
| I WANT TO ATTACH A VIDEO TO MY EMAIL AND SEND IT | MAIL, SEND, ATTACH, VIDEO | ... |
| I WANT TO DELETE THE VIDEO ATTACHED TO THE EMAIL I'M SENDING | MAIL, SEND, ATTACH, VIDEO, DELETE | ... |

Fig.3

INPUT : A , B , C ,

| ID | STORAGE KEY GROUP | NUMBER OF MATCHES | NUMBER OF DEFICIENCIES | NUMBER OF EXCESSES |
|---|---|---|---|---|
| 1 | A | 1 | 0 | 2 |
| 2 | A , B | 2 | 0 | 1 |
| 3 | A , B , C | 3 | 0 | 0 |
| 4 | A , B , C , D | 3 | 1 | 0 |
| 5 | A , D , F , E | 1 | 3 | 2 |
| 6 | A , B , G , H , I , J , K | 2 | 5 | 1 |
| 7 | A , B , C , E , F | 3 | 2 | 0 |

*Fig.4*

| CATEGORY | ID |
|---|---|
| PERFECT MATCH | 3 |
| DEFICIENT MATCH | 4, 7 |
| EXCESS MATCH | 1, 2 |
| EXCESS AND DEFICIENT MATCH | 5, 6 |

DIALOGUE SYSTEM

TECHNICAL FIELD

The present invention relates to a dialogue system.

BACKGROUND ART

Patent Literature 1 discloses a system that selects a combination of frequently asked questions corresponding to questions input in natural sentences and replies thereto from an FAQ database. In this system, the priority ranking of frequently asked questions is determined depending on, for example, the number of occurrences of a keyword in a question which is input by a user, the position of the keyword, or the like. In addition, reverse questions (return questions) for narrowing down the content of questions are output on the basis of questions having a high priority ranking.

CITATION LIST

Patent Literature

[Patent Literature 1] Japanese Unexamined Patent Publication No. 2015-36945

SUMMARY OF INVENTION

Technical Problem

As described above, in the system that determines a resulting sentence corresponding to a character string which is input by a user, the resulting sentence can be specified by the user's additional input being performed for a response of the system for prompting an additional input. In this case, it can be considered that the excessive repetition of a response of the system and the user's additional input causes the user to feel uncomfortable making an additional input for the response of the system. Consequently, in a case where such a system is adopted, it is necessary that the number of responses required to reach a resulting sentence which is requested by a user becomes smaller.

An object of an aspect of the present invention is to provide a dialogue system which is capable of reducing the number of responses required to reach a resulting sentence.

Solution to Problem

According to an aspect of the present invention, there is provided a dialogue system configured to perform a response for prompting a user to make an additional input with respect to the user's input of a character string and determine a resulting sentence corresponding to the user's input, the system including: a storage unit configured to store resulting sentence candidates which are candidates of the resulting sentence and a storage key group containing one or a plurality of stored keywords associated with the resulting sentence candidates; a keyword acquisition unit configured to acquire an input key group containing one or a plurality of input keywords associated with the character string on the basis of the input of the character string; a category generation unit configured to classify the resulting sentence candidates into a plurality of categories on the basis of a comparison between the input key group acquired by the keyword acquisition unit and the storage key group contained in the storage unit; an intra-category ranking determination unit configured to determine a priority ranking of the resulting sentence candidates within each of the categories; and a presentation unit configured to select a resulting sentence candidate of a highest priority ranking determined by the intra-category ranking determination unit from within a category of a highest priority ranking determined in advance, and present a response for prompting a user to make an additional input on the basis of the selected resulting sentence candidate.

In the above-described dialogue system, when a character string is input by a user, the input key group is acquired by the keyword acquisition unit. The input key group is compared with the storage key group of resulting sentence candidates stored in the storage unit, whereby the resulting sentence candidates are classified into a plurality of categories. In this manner, since categories are generated by comparing the input key group with the storage key group, resulting sentence candidates having the same relationship to the input key group belong to the same group. In this case, it is possible to efficiently prompt an additional input on the basis of resulting sentence candidates that belong to a category of a highest priority ranking among a plurality of categories, and to reduce the number of additional inputs.

Advantageous Effects of Invention

According to an aspect of the present invention, it is possible to provide a dialogue system which is capable of reduce the number of responses required to reach a resulting sentence.

BRIEF DESCRIPTION OF DRAWINGS

FIG. 2 is a diagram illustrating an FAQ database.

FIG. 3 is a diagram illustrating a relationship between input key and a key group.

FIG. 4 is a diagram illustrating a match list.

DESCRIPTION OF EMBODIMENTS

Figure 1:
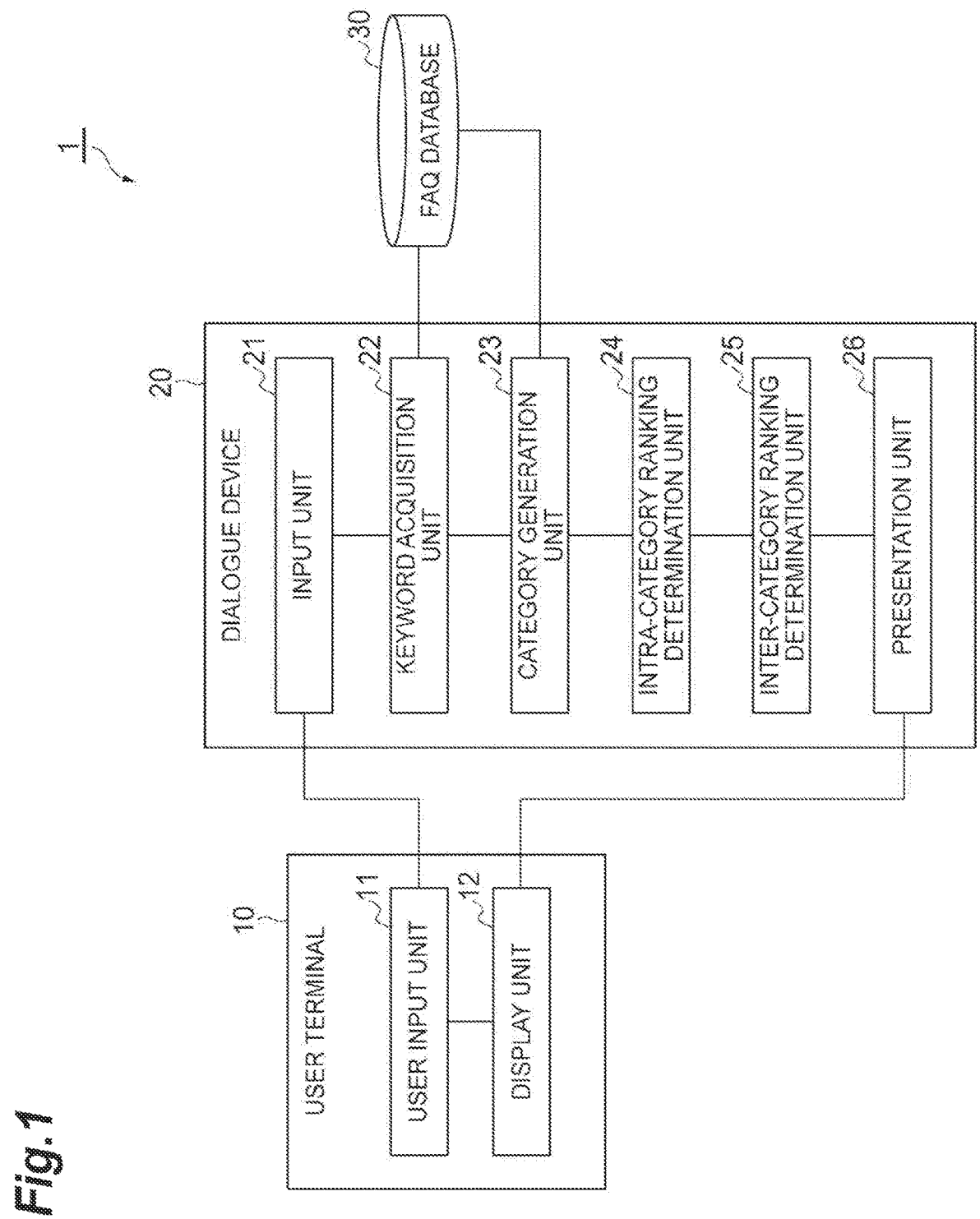
FIG. 1 is a block diagram illustrating a configuration of a dialogue system according to an embodiment.

Hereinafter, an embodiment of the present disclosure will be described in detail with reference to the accompanying drawings. For convenience, components which are substantially the same are denoted by the same reference numerals and signs, and may not be described.

FIG. 1 is a block diagram illustrating a configuration of a dialogue system according to an embodiment of the present disclosure. A dialogue system 1 is a system that performs a response (return question) for prompting a user to make an additional input with respect to the user's input of a character string and specifies the user's intention. The dialogue system 1 according to the present embodiment is a system that specifies optimum frequently asked questions (FAQ), and outputs a return question sentence for specifying a question sentence requested by a user to a terminal with respect to the user's input of a character string. A question sentence is specified by an additional input for the return question sentence being input from the user. For example, in a case where a sentence "video sent attached to email" is input by the user, a return question sentence for specifying a question sentence corresponding to this input is output. The return question sentence may be, for example, a sentence for questioning a user as to a keyword such as "Is your question about ∘∘?" or a sentence for confirming a question sentence to a user such as "Is your question ∘∘?" A user's additional input for a return question sentence may be, for example "YES," "NO," or the like. In a case where a question sentence is specified by an additional input, the dialogue system 1 outputs the specified question sentence and a reply of the question sentence.

The dialogue system 1 includes a terminal device 10, a dialogue device 20, and an FAQ database 30. The dialogue device 20 can transmit and receive data to and from the terminal device 10 and the FAQ database 30 through a moving object communication network or a communication network such as the Internet.

The terminal device 10 is an information processing terminal such as, for example, a smartphone, a cellular phone, a tablet terminal, a personal digital assistant (PDA), or a personal computer. The terminal device 10 is constituted by hardware such as a central processing unit (CPU), a memory, and a communication module. The terminal device 10 transmits and receives information to and from the dialogue device 20 through a communication network. The terminal device 10 includes a user input unit 11 and a display unit 12. The user input unit 11 accepts an input of an input sentence from a user. In addition, the user input unit 11 accepts an input of an additional input from a user with respect to a return question from the terminal device 10. The input sentence, the additional input, or the like accepted by the user input unit 11 is output to the dialogue device 20. The user input unit 11 is, for example, a touch panel display, and acquires an input sentence, an additional input, or the like on the basis of a user's operation. Meanwhile, the user input unit 11 may be constituted by a button, a keyboard, a microphone, or the like.

The display unit 12 displays the input sentence, the additional input, or the like accepted by the user input unit 11. In addition, the display unit 12 displays information of a return question sentence or the like which is input from the dialogue device 20. In a case where the user input unit 11 is constituted by a touch panel display, the display unit 12 can be constituted by the same touch panel display as that of the user input unit 11.

The FAQ database 30 is an information processing terminal such as a server computer as an example, and is constituted by hardware such as a CPU, a memory, and a communication module. FIG. 2 is an example of data stored in an FAQ database. As shown in FIG. 2, the FAQ database (storage unit) 30 stores a question sentence (resulting sentence candidate), a storage key group containing one or a plurality of stored keywords associated with the question sentence, and a reply of the question sentence. A stored keyword constituting the storage key group is a word extracted from a question sentence through a morphological analysis. For example, in a case where a question sentence is "I want to send email," the storage key group has "mail" and "send" as stored keywords. The reply is information managed by a system operator who manages the FAQ database 30, and is registered by, for example, the system operator. Meanwhile, when question sentences are stored in the FAQ database 30, an ID may be added to each of the question sentences with numerals or the like.

The dialogue device 20 is an information processing terminal such as a server computer as an example, and is constituted by hardware such as a CPU, a memory, and a communication module. As shown in FIG. 1, the dialogue device 20 includes an input unit 21, a keyword acquisition unit 22, a category generation unit 23, an intra-category ranking determination unit 24, an inter-category ranking determination unit 25, and a presentation unit 26. The input unit 21 is a portion that accepts an input sentence, an additional input, or the like which is input from the terminal device 10 by a user through a communication network.

The keyword acquisition unit 22 acquires an input key group containing one or a plurality of input keywords on the basis of the input sentence accepted by the input unit 21. The acquired input key group is held in association with the input sentence. For example, the keyword acquisition unit 22 extracts words from the input sentence using a technique such as a morphological analysis, and acquires the words as input keywords in a case where the extracted words are stored in the FAQ database as stored keywords. For example, in a case where an input sentence is "video sent attached to email," "mail," "attach," "send" and "video" are acquired as input keywords.

Further, the keyword acquisition unit 22 can update the input key group on the basis of a user's additional input for a return question sentence for specifying an input sentence. That is, in a case where the user's additional input for a return question for questioning about a keyword is acquired by the input unit 21, an input keyword can be added on the basis of the additional input. For example, in a case where an affirmative reply is acquired with respect to a return question sentence "Is your question about "delete"?," the input key group is updated so that "delete" is added as an input keyword. Meanwhile, the return question sentence is presented to the terminal device 10 by the presentation unit 26 to be described later.

The category generation unit 23 classifies question sentences stored in the FAQ database 30 into a plurality of categories. In the present embodiment, the category generation unit 23 acquires a question sentence corresponding to a storage key group containing at least one input keyword from the FAQ database 30. The category generation unit 23 classifies the acquired question sentences on the basis of a comparison between the input key group acquired by the keyword acquisition unit 22 and the storage key group contained in the FAQ database 30.

In a method of comparison between the input key group and the storage key group in the category generation unit 23, a "match key," a "deficient key" and an "excess key" are defined. The "match key" can be defined as a stored keyword of the storage key group which is coincident with an input keyword of the input key group. For example, in a case where the input key group has input keywords of "mail," "attach," "send" and "video," and the storage key group has stored keywords of "send," "mail," "attach" and "delete," a question sentence corresponding to the storage key group has "send," "mail" and "attach" as match keys.

The "deficient key" can be defined as a stored keyword of the storage key group in which the input key group is deficient. For example, in a case where the input key group has input keywords of "mail," "attach," "send" and "video," and the storage key group has stored keywords of "send," "mail," "attach" and "delete," a question sentence corresponding to the storage key group has "delete" as a deficient key.

The "excess key" can be defined as an input keyword of the input key group acquired in excess with respect to the storage key group.

For example, in a case where the input key group has input keywords of "mail," "attach," "send" and "video," and the storage key group has stored keywords of "send," "mail," "attach" and "delete," a question sentence corresponding to the storage key group has "video" as an excess key.

The category generation unit 23 classifies question sentences into a plurality of categories on the basis of the presence or absence of the deficient key and the presence or absence of the excess key. The categories defined by the category generation unit 23 include a "perfect match," a "deficient match," an "excess match" and an "excess and deficient match."

The "perfect match" is defined as a state in which the input key group and the storage key group are perfectly coincident with each other. That is, the category generation unit 23 classifies a question sentence, corresponding to a storage key group in which there are no the deficient key and no excess key, as a "perfect match."

The "deficient match" is defined as a state in which the storage key group is deficient in input keywords. That is, the category generation unit 23 classifies a question sentence, corresponding to a storage key group in which there is the deficient key and there is no excess key, as a "deficient match."

The "excess match" is defined as a state in which input keywords are acquired in excess with respect to the storage key group. That is, the category generation unit 23 classifies a question sentence, corresponding to a storage key group in which there is no deficient key and there is the excess key, as an "excess match."

The "excess and deficient match" is defined as a state in which the storage key group is deficient in input keywords and input keywords are acquired in excess with respect to the storage key group. That is, the category generation unit 23 classifies a question sentence, corresponding to a storage key group in which there are deficient keys and excess keys, as an "excess and deficient match."

FIG. 3 is a diagram illustrating a relationship between an input key group and a storage key group, and input keywords constituting the input key group and stored keywords constituting the storage key group are represented by letters for the sake of convenience. In the example of FIG. 3, an input key group consisting of input keywords of A, B, and C is acquired on the basis of an input sentence. In addition, question sentences acquired from the FAQ database 30 have IDs of 1 to 7, and have one or a plurality of stored keywords of A to K. The input keywords are A, B, and C, and thus A, B, and C of stored keywords contained in the storage key group are counted as match keys. In addition, D to K of the stored keywords contained in the storage key group are counted as deficient keys. In addition, in each ID, the keywords A to C which are not present in the storage key group are counted as excess keys. For example, in the question sentence of ID5, the number of matches is 1 since A is contained in the storage key group, the number of deficiencies is 3 since D, F and E are contained in the storage key group, and the number of excesses is 2 since B and C are not contained in the storage key group.

FIG. 4 is a diagram illustrating a match list. In FIG. 4, a match list of the question sentence in the example of FIG. 3 is shown. ID3 in which both the number of deficiencies and the number of excesses are zero is classified as a perfect match. ID4 and ID7 in which the numbers of excesses are zero and the numbers of deficiencies are not zero are classified as deficient matches. ID1 and ID2 in which the numbers of deficiencies are zero and the numbers of excesses are not zero are classified as excess matches. ID5 and ID6 in which neither the numbers of deficiencies nor the numbers of excesses are zero are classified as excess and deficient matches.

As described above, the keyword acquisition unit 22 updates the input key group on the basis of a user's additional input for a return question sentence for specifying an input sentence. In this case, a fluctuation may occur in a result of comparison between the input key group and the storage key group. Consequently, in a case where the input key group is updated by the keyword acquisition unit 22, the category generation unit 23 classifies the question sentences again.

The intra-category ranking determination unit 24 determines the priority ranking of question sentences within each category. For example, in a case where a plurality of question sentences are classified within one category, the intra-category ranking determination unit 24 may determine the priority ranking of the question sentences on the basis of the number of match keys contained in the question sentences.

As an example, the priority ranking can be determined in descending order of the number of match keys contained in the question sentences. In addition, the intra-category ranking determination unit 24 may determine the priority ranking of the question sentences on the basis of IDs of the question sentences. As an example, in a case where IDs added to the question sentences are numerals, the priority ranking can be determined in ascending order of values of the numerals. In addition, the intra-category ranking determination unit 24 may determine the priority ranking of the question sentences on the basis of the frequency of use of the question sentences. As an example, in the FAQ database 30, every time a question sentence is referenced by a user, the number of times of reference may be added as additional information of the question sentence. In this case, the priority ranking may be determined in descending order of the number of times of reference of question sentences. Further, the intra-category ranking determination unit 24 may compositely determine the number of match keys, IDs, and the number of times of reference and determine the priority ranking of question sentences.

As described above, the keyword acquisition unit 22 updates the input key group on the basis of a user's reply to a return question for specifying an input sentence. In this case, a fluctuation may occur in a result of comparison between the input key group and the storage key group. Consequently, in a case where the input key group is updated by the keyword acquisition unit 22, the intra-category ranking determination unit 24 updates the intra-category ranking The inter-category ranking determination unit 25 determines a priority ranking between a plurality of categories. In the present embodiment, the inter-category ranking determination unit 25 determines the inter-category priority ranking in the order of a perfect match, a deficient match, an excess match, and an excess and deficient match as an initial state. In addition, in a case where there is a question sentence having match keys of a certain proportion or more with respect to the input key group among question sentences which are classified as the excess match, the inter-category ranking determination unit 25 determines the inter-category priority ranking so that the excess match is given priority over the deficient match. That is, in this case, the inter-category ranking determination unit 25 changes the priority ranking in the order of the perfect match, the excess match, the deficient match, and the excess and deficient match. For example, in the examples of FIGS. 3 and 4, in a case where a setting is made in which the excess match having match keys of 60 percent or more with respect to the input key group is given priority over the deficient match, the question sentence of ID2 is given priority over the deficient match. In this case, the priority ranking is determined in the order of the perfect match, the excess match, the deficient match, and the excess and deficient match. In this manner, in a case where the priority ranking is changed depending on the proportion of match keys, ranking determination within a match list is performed in descending order of the number of match keys.

In addition, the inter-category ranking determination unit 25 changes the inter-category priority ranking on the basis of a user's additional input for a return question sentence. For example, in a case where a reply of "NO" is input consecutively a predetermined number of times with respect to a return question sentence for questioning about a deficient key ("Is your question about "○○"?"), the inter-category ranking determination unit 25 determines the inter-category priority ranking so that the excess match is given priority over the deficient match. In addition, in a case where a reply of "NO" is input consecutively a predetermined number of times with respect to a return question sentence for confirming a question sentence ("Is your question "○○"?"), the inter-category ranking determination unit 25 determines the inter-category priority ranking so that the deficient match is given priority over the excess match.

The presentation unit 26 selects a question sentence of a highest priority ranking determined by the intra-category ranking determination unit 24 from within a category of a highest priority ranking determined by the inter-category ranking determination unit 25. The presentation unit 26 outputs a return question sentence to the terminal device 10 on the basis of the selected question sentence. For example, in a case where the question sentence of highest priority is classified as a perfect match or an excess match, the presentation unit 26 outputs a return question sentence for confirming the question sentence to the terminal device 10. As an example, the presentation unit 26 acquires the whole question sentence. The presentation unit 26 generates a return question sentence in which the whole question sentence is quoted using quotation marks, and outputs this generated return question sentence to the terminal device 10. In addition, in a case where the question sentence of highest priority is classified as a deficient match or an excess and deficient match, the presentation unit 26 outputs a return question sentence for questioning about a deficient key contained in the question sentence to the terminal device 10. As an example, the presentation unit 26 acquires the deficient key contained in the question sentence. The presentation unit 26 generates a return question sentence in which the deficient key is quoted using quotation marks, and outputs this generated return question sentence to the terminal device 10. Meanwhile, in a case where the question sentence has a plurality of deficient keys, one deficient key is selected from among the plurality of deficient keys and a return question sentence is generated.

In addition, the presentation unit 26 may output information of the whole of a plurality of question sentences to the terminal device 10 so that the plurality of question sentences are displayed on the terminal device 10 as "question sentence candidates" in descending order of priority ranking determined by the inter-category ranking determination unit 25 and the intra-category ranking determination unit 24. The priority ranking is determined in descending order of the inter-category priority ranking That is, a question sentence which is prioritized next to an undermost question sentence in a category of a first priority ranking is a topmost question sentence in a category of a second priority ranking In the terminal device 10, display of a return question sentence or the like is executed in a state in which a plurality of question sentences are displayed.

Figure 5:
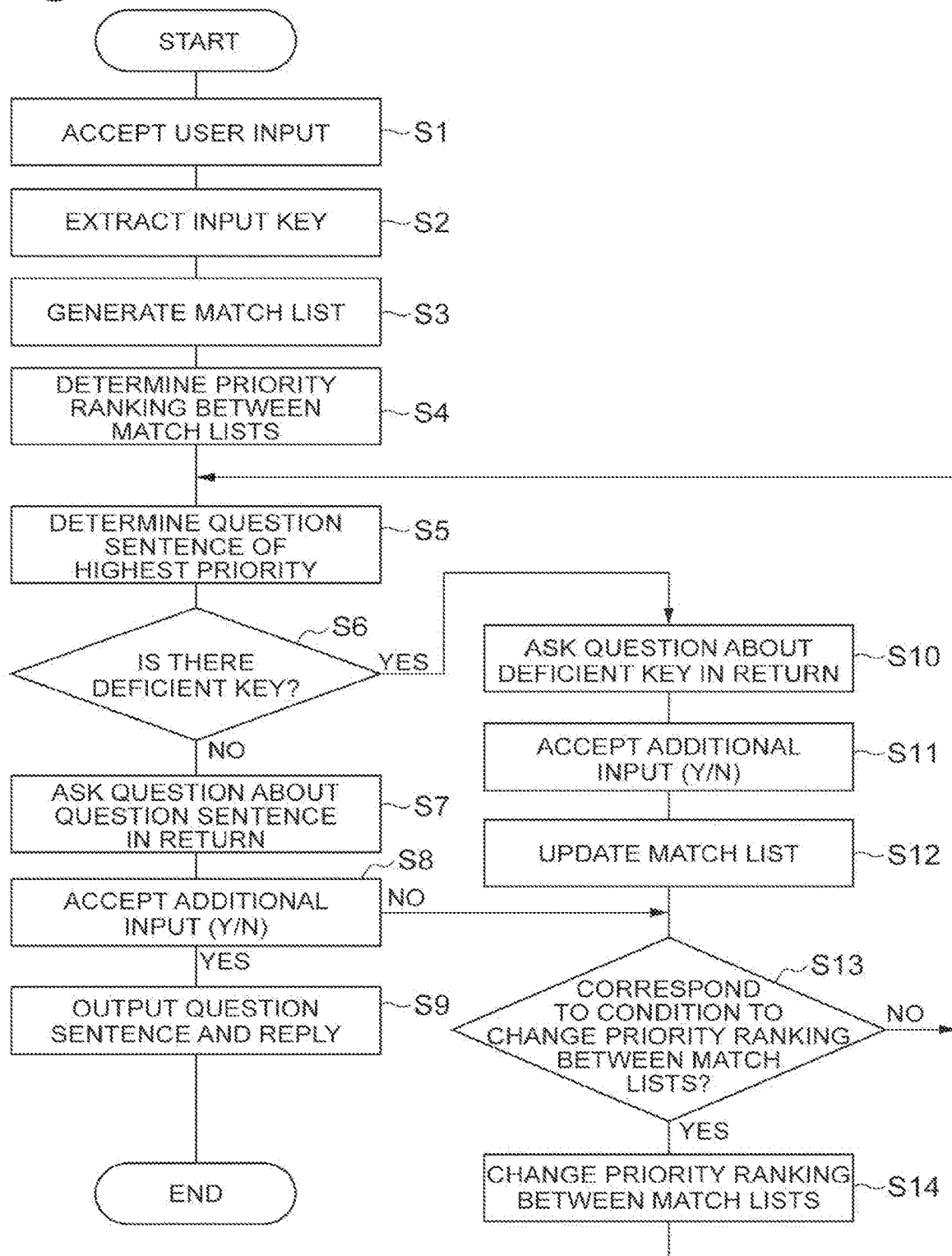
FIG. 5 is a flow diagram illustrating operations of the dialogue system.

Subsequently, operations of the dialogue system 1 will be described. FIG. 5 is a flow chart illustrating operations of the dialogue system. In the dialogue system 1, a user's input sentence is first accepted. That is, the user inputs an input sentence through the user input unit 11 of the terminal device 10. Thereby, the input unit 21 of the dialogue device 20 acquires the input sentence (step S1).

Subsequently, the keyword acquisition unit 22 acquires an input key corresponding to the input sentence on the basis of the input sentence (step S2). For example, in step S1, it is assumed that an input sentence that contains A, B, and C as input keywords is input. In this case, the keyword acquisition unit 22 acquires an input key group that contains A, B, and C as input keywords.

Subsequently, a match list corresponding to the input sentence is generated by a match list generation unit (step S3). In step S3, a question sentence that contains at least one input keyword as a stored keyword is first acquired from among the question sentences stored in the FAQ database 30 by the match list generation unit. The stored keywords of the acquired question sentence are divided into a match key, a deficient key, and an excess key, and the numbers of match keys, deficient keys and excess keys are derived for each question sentence. The match list generation unit classifies each question sentence as any of the perfect match, the deficient match, the excess match and the excess and deficient match on the basis of the presence or absence of the deficient key and the presence or absence of the excess key. In a case where a plurality of question sentences are classified into each category, the priority ranking within the category is determined by the intra-category ranking determination unit 24.

Subsequently, the priority ranking between the match lists is determined (step S4). In the present embodiment, the priority ranking is determined in the order of the perfect match, the deficient match, the excess match, and the excess and deficient match as an initial setting.

Subsequently, a question sentence of highest priority is determined (step S5). In step S5, a question sentence of a highest priority ranking within the category of a highest priority ranking is selected by the presentation unit 26. In the examples of FIGS. 3 and 4, since the number of question sentences classified as the perfect match which is a category of highest priority is only one, the question sentence of ID3 is selected.

Subsequently, it is determined whether the question sentence selected in step S5 has a deficient key (step S6). In a case where the selected question sentence is the perfect match or the excess match, it is determined that that there is no deficient key and the process proceeds to step S7. In step S7, a return question sentence for specifying the question sentence is output to the terminal device 10 by the presentation unit 26. For example, in a case where the content of the question sentence is "I want to attach a video to my email and send it," a return question sentence of "Is your question "I want to attach a video to my email and send it"?" is output.

In the terminal device 10, an additional input for a return question sentence for specifying a question sentence is accepted (step S8). In a case where the additional input for a return question sentence is "YES," the presentation unit 26 outputs a reply corresponding to the question sentence together with the question sentence to the terminal device 10 (step S9).

On the other hand, in a case where an additional input in step S8 is "NO," the process of the dialogue system 1 proceeds to step S13. Step S13 will be described later.

In step S6, in a case where the selected question sentence is the deficient match or the excess and deficient match, it is determined there is the deficient key and the process proceeds to step S10. In step S10, a return question sentence for questioning about the deficient key is generated by the presentation unit 26, and this return question sentence is output to the terminal device 10. For example, in a case where a question sentence of "I want to delete the video attached to the email I'm sending" is selected with respect to an input sentence of "video sent attached to email," a return question sentence of "Is your question about "delete"?" is output.

In the terminal device 10, the acceptance of a user's additional input is executed together with display of the return question sentence (step S11). When the additional input for the return question sentence is input to the terminal device 10 by the user, the additional input is output from the terminal device 10 to the dialogue device 20. In the dialogue device 20, the additional input from the user is accepted, and the match list is updated (step S12). That is, in a case where the user inputs an additional input for affirming the return question sentence, the keyword acquisition unit 22 acquires the deficient key contained in the return question sentence as an input keyword, and updates the input key group. For example, in a case where an additional input of "YES" is performed in response to a return question sentence of "Is your question about "delete"?," "delete" is newly acquired as an input keyword. Thereby, since a fluctuation may occur in a result of comparison between the input key group and the storage key group, the category generation unit 23 classifies the question sentences again so as to correspond to a new input key group. Meanwhile, in a case where the user inputs an additional input for negating the return question sentence, the match list may not be updated.

Subsequently, it is determined by an inter-match list ranking determination unit whether it corresponds to a condition to change the priority ranking between match lists (step S13). In the present embodiment, as described above, for example, in a case where an additional input for the return question sentence is "NO" consecutively a predetermined number of times, it is determined to correspond to a condition to change the priority ranking between match lists.

In step S13, in a case where it is determined to correspond to a condition to change the priority ranking between match lists, the priority ranking between match lists is changed by the inter-match list ranking determination unit (step S14). In a case where "NO" is input consecutively a predetermined number of times with respect to the return question sentence for questioning about a deficient key, the inter-category ranking determination unit 25 prioritizes the excess match over the deficient match. In addition, in a case where "NO" is input consecutively a predetermined number of times with respect to a return question sentence for confirming the question sentence ("Is your question "○○"?"), the inter-category ranking determination unit 25 prioritizes the deficient match over the excess match.

Subsequently, going back to step S5, a question sentence of highest priority is determined on the basis of the updated match list and the updated priority ranking between match lists, and step S5 and the subsequent operations are repeated. Meanwhile, operations from the input of an input sentence to the specification of a final question sentence may be controlled so that a return question for confirming a question sentence having the same ID is not performed multiple times.

For example, in a case where a question sentence once confirmed as "Is your question "○○"?" to the user is ranked as the highest priority again, a question sentence of the next priority ranking of the question sentence may be selected by the presentation unit 26.

Figure 6:
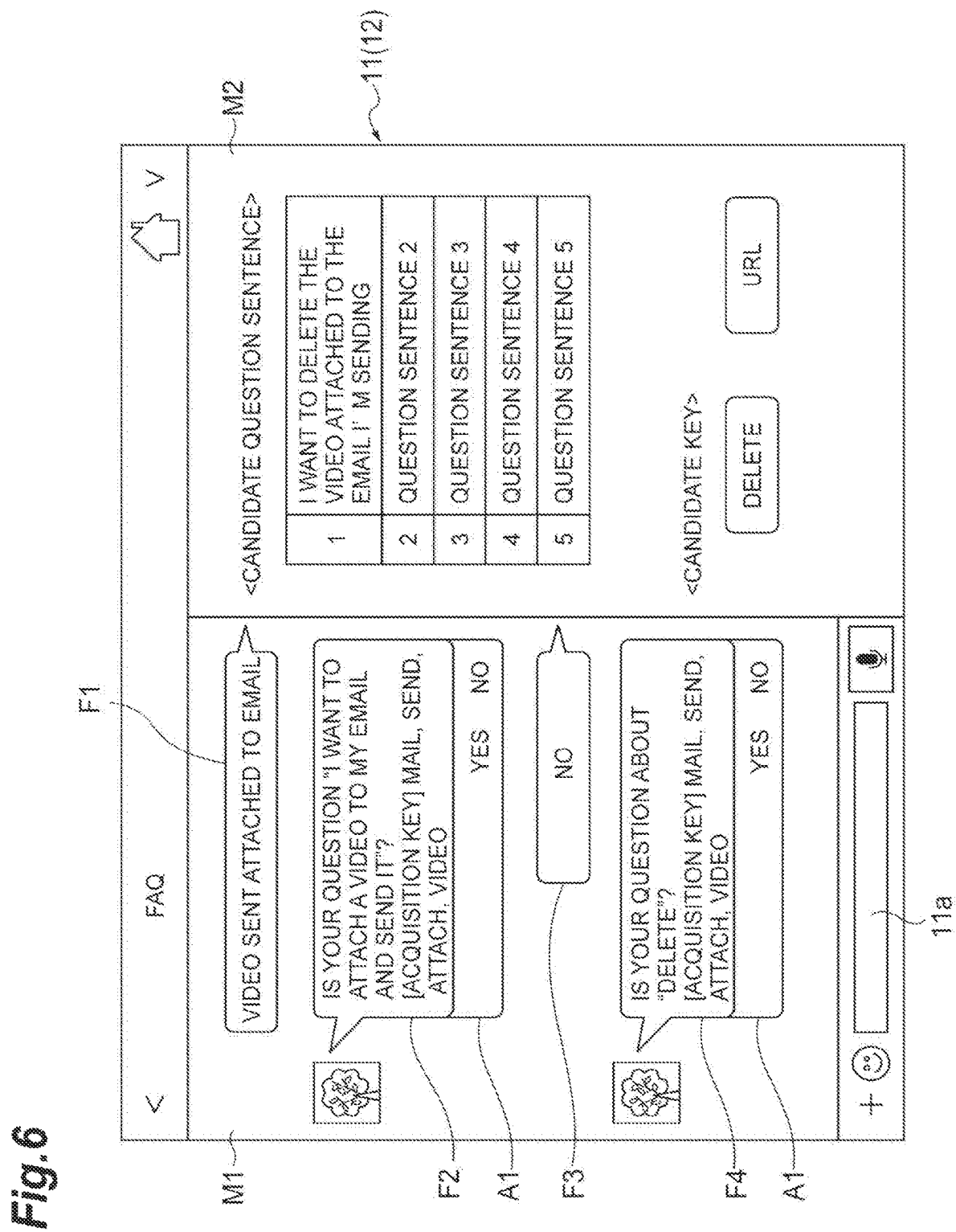
FIG. 6 is a diagram illustrating an example of a screen which is displayed on a terminal device.

FIG. 6 is a diagram illustrating a display screen of the terminal device 10, and shows the progress of a dialogue between the terminal device 10 (a user) and the dialogue device 20. Here, the terminal device 10 including a touch panel display will be described. Therefore, the display unit 12 functions as the user input unit 11, and a user can input and select information by tapping an icon or the like which is displayed on the display unit 12. The display screen of the display unit 12 includes a main screen M1 and an auxiliary screen M2. An input window 11a of the main screen M1 is a portion that accepts a character input through a touch panel. Balloons F1 to F4 are portions indicating dialogues between a user and the dialogue system 1. An icon A1 is a portion that accepts an additional input.

On the main screen M1, the balloon F1 indicates an input sentence which is input to the terminal device 10 by a user. The balloon F3 indicates an additional input which is input to the terminal device 10 by the user. The balloons F2 and F4 indicate return question sentences generated in the dialogue device 20 with respect to the input sentence which is input by the user. In the shown example, the balloons of the dialogue system including the FAQ database shown in FIG. 2 are exemplified.

For example, in the terminal device 10, when the input sentence shown in the balloon F1 is input, the return question sentence transmitted from the dialogue device 20 is output as shown in the balloon F2. In the shown example, input keywords acquired by the keyword acquisition unit 22 are displayed as an "acquisition key" together with the return question sentence. In addition, in the balloon F2, the icon A1 (YES, NO) indicating an additional input that can be selected by the user is shown together with the return question sentence. The user can input either of "YES" and "NO" by tapping the icon A1. In the balloon F2, since a return question for confirming the question sentence is performed, a reply to the question sentence is displayed on the screen when the user taps "YES."

In the example of FIG. 6, as shown in the balloon F3, "NO" is input by the user. In this case, the display unit 12 displays the balloon F3. In F3, a sentence for questioning about "delete" which is a deficient key in return is displayed.

In addition, question sentences having a high priority ranking are displayed on the auxiliary screen M2 as "candidate question sentences." The candidate question sentences are candidates for question sentences which are content about that a user wants to ask. The auxiliary screen M2 shows candidates for a plurality of question sentences in response to the user's input. For example, each of the question sentences constituting candidate question sentences can be selected by the user. In a case where a question sentence is selected by the user, information of the selected question sentence is output to the dialogue device 20. The dialogue device 20 outputs a reply corresponding to the selected question sentence to the terminal device 10. Thereby, in the terminal device 10, a reply to the selected question can be displayed. Further, the auxiliary screen M2 contains candidate keys. These candidate keys are keys having the possibility of being contained in the candidate question sentences. On the auxiliary screen M2, "delete" and "URL" are shown as candidate keys. For example, "delete" is contained in a candidate question sentence of a highest priority ranking In the dialogue system 1 described above, when a character string is input by a user, the input key group is acquired by the keyword acquisition unit 22. The input key group is compared with the storage key group of resulting sentence candidates stored in the storage unit, whereby the resulting sentence candidates are classified into a plurality of categories. In this manner, since categories are generated by comparing the input key group with the storage key group, resulting sentence candidates having the same relationship to the input key group belong to the same group. In this case, it is possible to efficiently prompt an additional input on the basis of resulting sentence candidates that belong to a category of a highest priority ranking among a plurality of categories, and to reduce the amount of dialogue. In addition, the amount of dialogue is reduced, whereby it is possible to reduce the amount of data communication as a result. In addition, the effect of enabling the processing efficiency of the dialogue system 1 to be improved is exhibited. That is, since dialogues are not unnecessarily continued, it is possible to reduce the processing load of the dialogue system 1, and to improve processing efficiency for the dialogues.

In addition, the dialogue system 1 includes the inter-category ranking determination unit 25 that determines a category of a highest priority ranking between a plurality of categories. The inter-category ranking determination unit 25 of the present embodiment determines the inter-category priority ranking on the basis of a user's additional input for a return question. That is, the user's additional input is reflected in the inter-category priority ranking Since the inter-category priority ranking is determined depending on the user's intention, the inter-category priority ranking is appropriately determined. Thereby, it is possible to execute a return question to the user so that the number of questions is reduced.

In addition, the category generation unit 23 generates categories on the basis of the presence or absence of the deficient key and the presence or absence of the excess key. That is, the category generation unit 23 generates categories on the basis of a classification in which a case where there are no deficient key and no excess key is defined as a perfect match, a case where there is the deficient key and there is no excess key is defined as a deficient match, a case where there is no deficient key and there is the excess key is defined as an excess match, and a case where there are the deficient key and the excess key is defined as an excess and deficient match. In a case where a user's intention for an input sentence is attempted to be specified on the basis of the acquired keywords, there is, generally, a tendency to specify the user's intention as the number of keywords acquired becomes larger. Particularly, when the acquired keywords are to determine the user's intention, it is possible to accurately narrow down question sentences. On the other hand, in a case where the acquired keywords do not reflect the user's intention, it is not possible to reach a correct question sentence even if the user is questioned about a question sentence containing the keywords in return. In the present embodiment, relationships between the user's input sentences and the question sentences of the FAQ database 30 are clarified by defining the deficient key and the excess key. Therefore, it is possible to easily determine whether sufficient keywords to specify questions are acquired in response to the user's additional input. For example, in a case where the user replies "NO" consecutively in response to a return question for questioning about the deficient key of the deficient match, it can be considered that sufficient keywords have already been acquired. In addition, in a case where the user replies "NO" consecutively in response to a return question for confirming a question sentence of the excess match, it can be considered that sufficient keywords have not been acquired.

The intra-category ranking determination unit 24 updates the intra-category ranking on the basis of the user's reply to a response for prompting an additional input. Because the content of the user's additional input is reflected in the intra-category priority ranking, the user's intention can be accurately reflected in the intra-category priority ranking every time a return question is repeated.

The keyword acquisition unit 22 updates the input key group on the basis of the user's reply to a response for prompting an additional input, and the category generation unit 23 classifies the match lists again in a case where the input key group is updated by the keyword acquisition unit 22. Because the match lists are updated in accordance with the update of the input key group, the user's intention can be accurately reflected in the match lists.

The presentation unit 26 presents a plurality of question sentences in descending order of the priority ranking determined by the intra-category ranking determination unit 24. In such a configuration, question sentences having a high priority ranking are presented at all times, so that the user can easily recognize for which question sentence a question is being asked in return. In addition, in a case where there is a question intended by the user among candidate question sentences, the user can display a reply by selecting the question, which leads to an improvement in usability and a reduction in the amount of dialogue.

Hereinbefore, the embodiment has been described in detail with reference to the accompanying drawings, but specific configurations are not limited to this embodiment.

Meanwhile, the block diagram used in the description of the above embodiment represents blocks in units of functions. These functional blocks (constituent elements) are realized by any combination of hardware and/or software. In addition, means for realizing each functional block is not particularly limited. That is, each functional block may be realized by one device which is physically and/or logically coupled, or may be realized by two or more devices which are physically and/or logically separated from each other by connecting the plurality of devices directly and/or indirectly (for example, wiredly and/or wirelessly).

Figure 7:
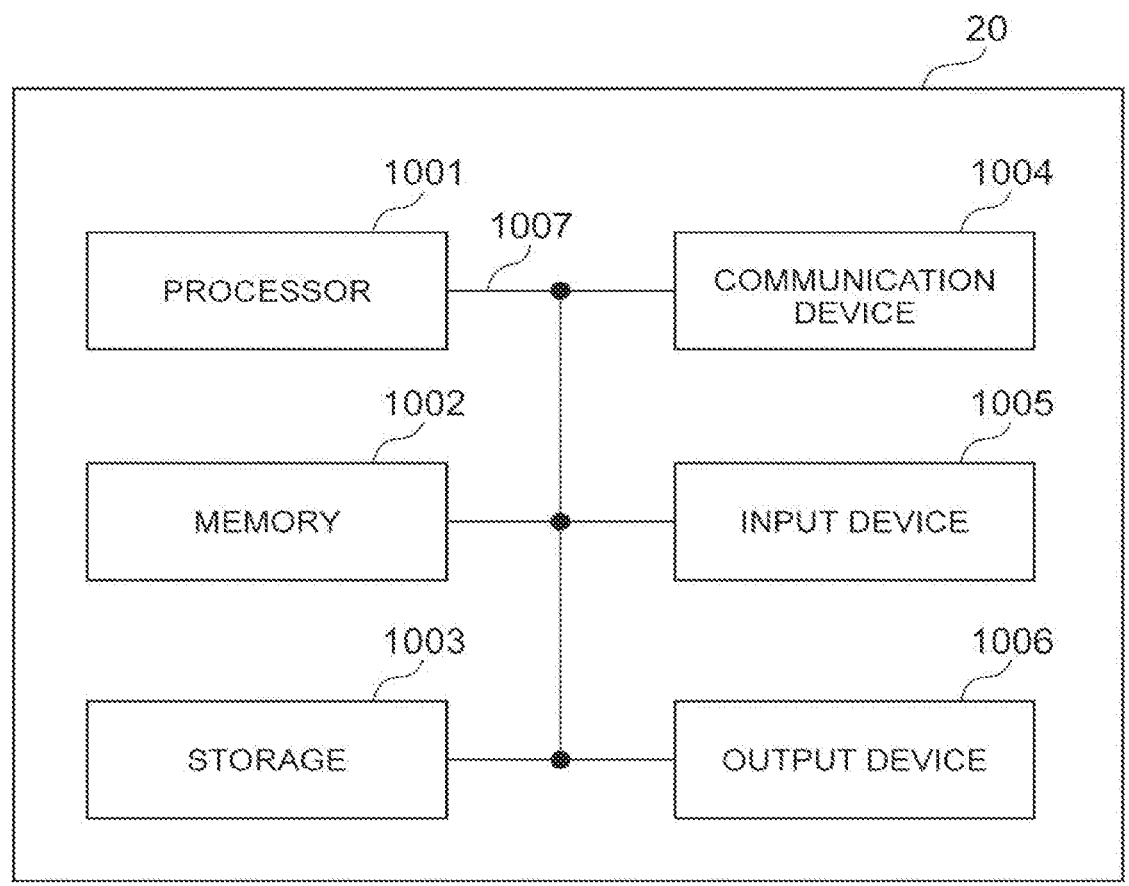
FIG. 7 is a diagram illustrating a hardware configuration of a dialogue device.

For example, the dialogue device 20 in an embodiment of the present disclosure may function as a computer that performs the process of the dialogue device 20 of the present embodiment. FIG. 7 is a diagram illustrating an example of a hardware configuration of the dialogue device 20 according to the present embodiment. The above-described dialogue device 20 may be physically configured as a computer device including a processor 1001, a memory 1002, a storage 1003, a communication device 1004, an input device 1005, an output device 1006, a bus 1007, and the like. In addition, the terminal device 10 and the FAQ database 30 may also have the same hardware configuration.

Meanwhile, in the following description, the wording "device" may be replaced by a circuit, a device, a unit, or the like. The hardware configuration of the dialogue device 20 may be configured to include one or a plurality of devices shown in the drawings, or may be configured without including some devices.

The processor 1001 performs an arithmetic operation by reading predetermined software (a program) on hardware such as the processor 1001 or the memory 1002, and thus each function in the dialogue device 20 is realized by controlling communication in the communication device 1004 and reading and/or writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, each function of the dialogue device 20 may be realized by the processor 1001.

In addition, the processor 1001 reads out a program (a program code), a software module and data from the storage 1003 and/or the communication device 1004 into the memory 1002, and executes various types of processes in accordance therewith. An example of the program which is used includes a program causing a computer to execute at least some of the operations described in the foregoing embodiment. For example, each function of the dialogue device 20 is stored in the memory 1002, and may be realized by a control program which is operated by the processor 1001. The execution of various types of processes described above by one processor 1001 has been described, but these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (a program code), a software module, or the like that can be executed in order to carry out a method according to an embodiment of the present invention.

The storage 1003 is a computer readable recording medium, and may be constituted by at least one of, for example, an optical disc such as a compact disc ROM (CD-ROM), a hard disk drive, a flexible disk, a magnetooptic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including the memory 1002 and/or the storage 1003, a server, or another suitable medium.

The communication device 1004 is hardware (transmitting and receiving device) for performing communication between computers through a wired and/or wireless network, and is also referred to as, for example, a network device, a network controller, a network card, a communication module, or the like. For example, each function of the dialogue device 20 described above may be realized by the communication device 1004.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be constituted by a single bus, or may be constituted by a different bus between devices.

In addition, the dialogue device 20 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, at least one of these types of hardware may be mounted in the processor 1001.

Hereinbefore, the present embodiments have been described in detail, but it is apparent to those skilled in the art that the present embodiments should not be limited to the embodiments described in this specification. The present embodiments can be implemented as modified and changed aspects without departing from the spirit and scope of the present invention, which are determined by the description of the scope of claims. Therefore, the description of this specification is intended for illustrative explanation only, and does not impose any limited interpretation on the present embodiments.

Notification of information is not limited to the aspects/embodiments described in the present specification, and may be performed using other methods. For example, the notification of information may be performed by physical layer signaling (such as downlink control information (DCI) or uplink control information (UCI)), upper layer signaling (such as radio resource control (RRC) signaling, medium access control (MAC) signaling, or broadcast information (such as a master information block (MIB) and a system information block (SIB)), other signals, or combinations thereof. In addition, the RRC signaling may be referred to as an RRC message and may be referred to as, for example, an RRC connection setup message or an RRC connection reconfiguration message.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), or other appropriate systems and/or next-generation systems to which these systems are extended on the basis thereof.

The order of the processing sequences, the sequences, the flowcharts, and the like of the aspects/embodiments described above in this specification may be changed as long as they are compatible with each other. For example, in the methods described in this specification, various steps as elements are described in an exemplary order but the methods are not limited to the described specific order.

A specific operation which is performed by a specific device in this specification may be performed by an upper node with respect thereto in some cases. For example, in a case where the specific device is a base station, in a network constituted by one or a plurality of network nodes including the base station, it is obvious that various operations which are performed to communicate with a terminal can be performed by the base station and/or other network nodes other than the base station (for example, an MME or an S-GW can be conceived but the network nodes are not limited thereto). A case in which the number of network nodes other than the base station is one has been described above, but a combination of a plurality of different network nodes (for example, an MME and an S-GW) may be used.

Information or the like can be output from an upper layer (or a lower layer) to a lower layer (or an upper layer). Information or the like may be input or output via a plurality of network nodes.

The input or output information or the like may be stored in a specific place (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Information, a signal or the like described in this specification may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in this specification and/or the terms required for understanding this specification may be substituted by terms having the same or similar meanings. For example, a channel and/or a symbol may be a signal. In addition, the signal may be a message. In addition, a component carrier (CC) may be referred to as a carrier frequency, a cell, or the like.

The terms "system" and "network" which are used in this specification are used interchangeably.

In addition, information, parameters, and the like described in this specification may be expressed as absolute values, may be expressed by values relative to a predetermined value, or may be expressed by other corresponding information. For example, radio resources may be indicated by indices.

Names which are used for the parameters are not restrictive from any viewpoint. Further, expressions or the like using the parameters may be different from the expressions which are explicitly disclosed in this specification. Since various channels (for example, a PUCCH or a PDCCH) and information elements (for example, a TPC) can be distinguished by any appropriate name, various names given to various channels and information elements are not restrictive from any viewpoint.

A mobile communication terminal may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The term "determining" which is used in this specification may include various types of operations. The term "determining" may include regarding operations such as, for example, judging, calculating, computing, processing, deriving, investigating, looking up (for example, looking up in a table, a database or a separate data structure), or ascertaining as an operation such as "determining." In addition, the term "determining" may include regarding operations such as receiving (for example, receiving information), transmitting (for example, transmitting information), input, output, or accessing (for example, accessing data in a memory) as an operation such as "determining." In addition, the term "determining" may include regarding operations such as resolving, selecting, choosing, establishing, or comparing as an operation such as "determining " That is, the term "determining" may include regarding some kind of operation as an operation such as "determining."

The terms "connected" and "coupled" and every modification thereof refer to direct or indirect connection or coupling between two or more elements and can include that one or more intermediate element is present between two elements "connected" or "coupled" to each other. The coupling or connecting of elements may be physical, may be logical, or may be a combination thereof. In this specification, two elements can be considered to be "connected" or "coupled" to each other when one or more electrical wires, cables, and/or printed electric connections are used or by using electromagnetic energy such as electromagnetic energy having wavelengths in a radio frequency range, a microwave area, and a light (both visible light and invisible light) area as non-restrictive and non-comprehensive examples.

An expression "on the basis of ~" which is used in this specification does not refer to "on the basis of only ~," unless otherwise described. In other words, the expression "on the basis of ~" refers to both "on the basis of only ~" and "on the basis of at least ~."

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

Insofar as the terms "include" and "including" and modifications thereof are used in this specification or the claims, these terms are intended to have a comprehensive meaning similarly to the term "comprising." Further, the term "or"

which is used in this specification or the claims is intended not to mean an exclusive logical sum.

In this specification, a single device is assumed to include a plurality of devices unless only one device may be present in view of the context or the technique. In the entire disclosure, a singular form is intended to include a plural form unless the context indicates otherwise.

REFERENCE SIGNS LIST

1 Dialogue system, 22 Keyword acquisition unit, 23 Category generation unit, 24 Intra-category ranking determination unit, 25 Inter-category ranking determination unit, 26 Presentation unit, 30 FAQ database (storage unit)

The invention claimed is:

1. A dialogue system configured to perform a response for prompting a user to make an additional input with respect to the user's input of a character string and determine a resulting sentence corresponding to the user's input, the system comprising:
    a memory configured to store resulting sentence candidates which are candidates of the resulting sentence and a storage key group containing one or a plurality of stored keywords associated with the resulting sentence candidates; and
    processing circuitry configured to
        acquire an input key group containing one or a plurality of input keywords associated with the character string on the basis of the input of the character strings,
        classify the resulting sentence candidates into a plurality of categories on the basis of a comparison between the acquired input key group and the storage key group contained in the memory,
        determine a priority ranking of the resulting sentence candidates within each of the categories, and
        select a resulting sentence candidate of a highest priority ranking determined by the intra-category ranking determination unit from within a category of a highest priority ranking determined in advance, and
        present a response for prompting a user to make an additional input on the basis of the selected resulting sentence candidate,
    wherein, in the comparison between the input key group and the storage key group, in a case where the stored keyword of the storage key group in which the input key group is deficient is defined as a deficient key, and the input keyword of the input key group acquired in excess with respect to the storage key group is defined as an excess key, the processing circuitry generates the category on the basis of the presence or absence of the deficient key and the presence or absence of the excess key.

2. The dialogue system according to claim 1, wherein the processing circuitry is configured to determine the category of a highest priority ranking between the plurality of categories.

3. The dialogue system according to claim 2, wherein the processing circuitry determines an inter-category priority ranking on the basis of the user's reply to the response for prompting an additional input.

4. The dialogue system according to claim 1, wherein the processing circuitry generates the category, with respect to each of the resulting sentence candidates, on the basis of a classification in which
    a case where there are no deficient key and no excess key is defined as a perfect match,
    a case where there is the deficient key and there is no excess key is defined as a deficient match,
    a case where there is no deficient key and there is the excess key is defined as an excess match, and
    a case where there are the deficient key and the excess key is defined as an excess and deficient match.

5. The dialogue system according to claim 1, wherein the processing circuitry updates an intra-category ranking on the basis of the user's reply to the response for prompting an additional input.

6. The dialogue system according to claim 1, wherein the processing circuitry:
    updates the input key group on the basis of the user's reply to the response for prompting an additional input, and
    the category generation unit classifies the resulting sentence candidates again in a case where the input key group is updated.

7. The dialogue system according to claim 1, wherein the processing circuitry presents a plurality of resulting sentence candidates in descending order of the determined priority ranking.

8. The dialogue system according to claim 1, wherein the resulting sentence corresponding to the user's input is a sentence that seeks to verify the user's input.

9. The dialogue system according to claim 1, wherein the processing circuitry generates the category, with respect to each of the resulting sentence candidates, on the basis of a classification in which
    a case where there are no deficient key and no excess key is defined as a perfect match,
    a case where there is the deficient key and there is no excess key is defined as a deficient match,
    a case where there is no deficient key and there is the excess key is defined as an excess match, and
    a case where there are the deficient key and the excess key is defined as an excess and deficient match, and
    the processing circuitry is configured to determine the category of a highest priority ranking between the plurality of categories.

10. A method, implemented by a dialogue system configured to perform a response for prompting a user to make an additional input with respect to the user's input of a character string and determine a resulting sentence corresponding to the user's input, the method comprising:
    storing, at a memory, resulting sentence candidates which are candidates of the resulting sentence and a storage key group containing one or a plurality of stored keywords associated with the resulting sentence candidates; and
    acquiring, by processing circuitry, an input key group containing one or a plurality of input keywords associated with the character string on the basis of the input of the character string;
    classifying, by the processing circuitry, the resulting sentence candidates into a plurality of categories on the basis of a comparison between the acquired input key group and the storage key group contained in the memory;
    determining, by the processing circuitry, a priority ranking of the resulting sentence candidates within each of the categories; and
    selecting, by the processing circuitry, a resulting sentence candidate of a highest priority ranking determined by the intra-category ranking determination unit from within a category of a highest priority ranking determined in advance, and presenting a response for prompting a user to make an additional input on the basis of the selected resulting sentence candidate, wherein, in the comparison between the input key group and the storage key group, in a case where the stored keyword of the storage key group in which the input key group is deficient is defined as a deficient key, and the input keyword of the input key group acquired in excess with respect to the storage key group is defined as an excess key, the processing circuitry generates the category on the basis of the presence or absence of the deficient key and the presence or absence of the excess key.

\* \* \* \* \*